（12） United States Patent
Chen

(10) Patent No.: US 11,556,124 B2
(45) Date of Patent: Jan. 17, 2023

(54) SYSTEM AND METHOD FOR UPDATING VEHICLE OPERATION BASED ON REMOTE INTERVENTION

(71) Applicant: Beijing Voyager Technology Co., Ltd., Beijing (CN)

(72) Inventor: Qi Chen, Burlingame, CA (US)

(73) Assignee: Beijing Voyager Technology Co., Ltd, Beijing (CN)

( * ) Notice: Subject to any disclaimer, the term of this patent is extended or adjusted under 35 U.S.C. 154(b) by 206 days.

(21) Appl. No.: 16/721,435

(22) Filed: Dec. 19, 2019

(65) Prior Publication Data

US 2020/0209846 A1 Jul. 2, 2020

Related U.S. Application Data

(60) Provisional application No. 62/786,261, filed on Dec. 28, 2018.

(51) Int. Cl.
| | |
|---|---|
| G05D 1/00 | (2006.01) |
| B60W 30/18 | (2012.01) |
| G05D 1/02 | (2020.01) |

(52) U.S. Cl.
CPC ..... G05D 1/0038 (2013.01); B60W 30/18163 (2013.01); G05D 1/0088 (2013.01);
(Continued)

(58) Field of Classification Search
CPC .. G05D 1/0038; G05D 1/0088; G05D 1/0231; G05D 2201/0213; B60W 30/18163; B60W 2554/00; B60W 2556/45
See application file for complete search history.

(56) References Cited

U.S. PATENT DOCUMENTS 9,355,562 B1 * 5/2016 Ferguson ................ G08G 1/20
10,459,440 B2 * 10/2019 Rust ..................... G05D 1/0238
(Continued)

FOREIGN PATENT DOCUMENTS

| CN | 108873902 A | 11/2018 |
|---|---|---|
| EP | 2269884 B1 | 3/2013 |

(Continued)

OTHER PUBLICATIONS

International Search Report and Written Opinion in corresponding Inernational Patent Application No. PCT/US2019/067620, dated Mar. 16, 2020, in 13 pages.
(Continued)

*Primary Examiner* — Ramsey Refai
(74) *Attorney, Agent, or Firm* — Knobbe, Martens, Olson & Bear, LLP

(57) ABSTRACT

Technologies disclosed relate to a remote intervention system for the operation of a vehicle, which can be an autonomous vehicle, a vehicle that includes driver assist features, a vehicle used for ride sharing services or the like. The system includes a vehicle sending a request for remote intervention to a remote operator when the operation of the vehicle is suspended. The request for remote intervention can include a request for object identification or a request for decision confirmation. The vehicle can update vehicle operation based in part on vehicle-based sensor data and a response to the remote intervention request from the remote operator. The remote operator can be a human operator or an AI operator.

24 Claims, 12 Drawing Sheets

(52) U.S. Cl.
CPC ....... *G05D 1/0231* (2013.01); *B60W 2554/00* (2020.02); *B60W 2556/45* (2020.02); *G05D 2201/0213* (2013.01)

(56) References Cited

U.S. PATENT DOCUMENTS

| | | | | |
|---|---|---|---|---|
| 10,990,094 | B2* | 4/2021 | Ross | B60W 30/165 |
| 11,099,561 | B1 | 8/2021 | Kentley-klay | |
| 2013/0274986 | A1 | 10/2013 | Trepagnier et al. | |
| 2015/0248131 | A1* | 9/2015 | Fairfield | G05D 1/0044 701/2 |
| 2016/0139594 | A1 | 5/2016 | Okumura et al. | |
| 2016/0375912 | A1* | 12/2016 | Christensen | B60W 30/143 701/25 |
| 2017/0192423 | A1* | 7/2017 | Rust | G05D 1/0238 |
| 2017/0192426 | A1 | 7/2017 | Rust | |
| 2017/0227366 | A1* | 8/2017 | Laur | G01C 21/32 |
| 2018/0257643 | A1 | 9/2018 | Kroop et al. | |
| 2018/0267558 | A1 | 9/2018 | Tiwari et al. | |
| 2018/0364705 | A1 | 12/2018 | Yunoki et al. | |
| 2019/0019349 | A1* | 1/2019 | Dolgov | G07C 5/008 |
| 2019/0137287 | A1 | 5/2019 | Pazhayampallil et al. | |
| 2019/0383624 | A1* | 12/2019 | Magzimof | H04B 17/373 |
| 2020/0019185 | A1 | 1/2020 | Magzimof et al. | |
| 2020/0192398 | A1 | 6/2020 | Xu et al. | |
| 2020/0209845 | A1 | 7/2020 | Chen | |

FOREIGN PATENT DOCUMENTS

| | | |
|---|---|---|
| WO | WO 2019/010128 A1 | 1/2019 |
| WO | WO 2020/139713 A1 | 7/2020 |
| WO | WO 2020/139714 A1 | 7/2020 |

OTHER PUBLICATIONS

Written Opinion of the International Preliminary Examining Authority in corresponding Inernational Patent Application No. PCT/US2019/067620, dated Dec. 9, 2020, in 6 pages.

International Search Report and Written Opinion in corresponding International Patent Application No. PCT/US2019/067596, dated Mar. 13, 2020, in 13 pages.

* cited by examiner

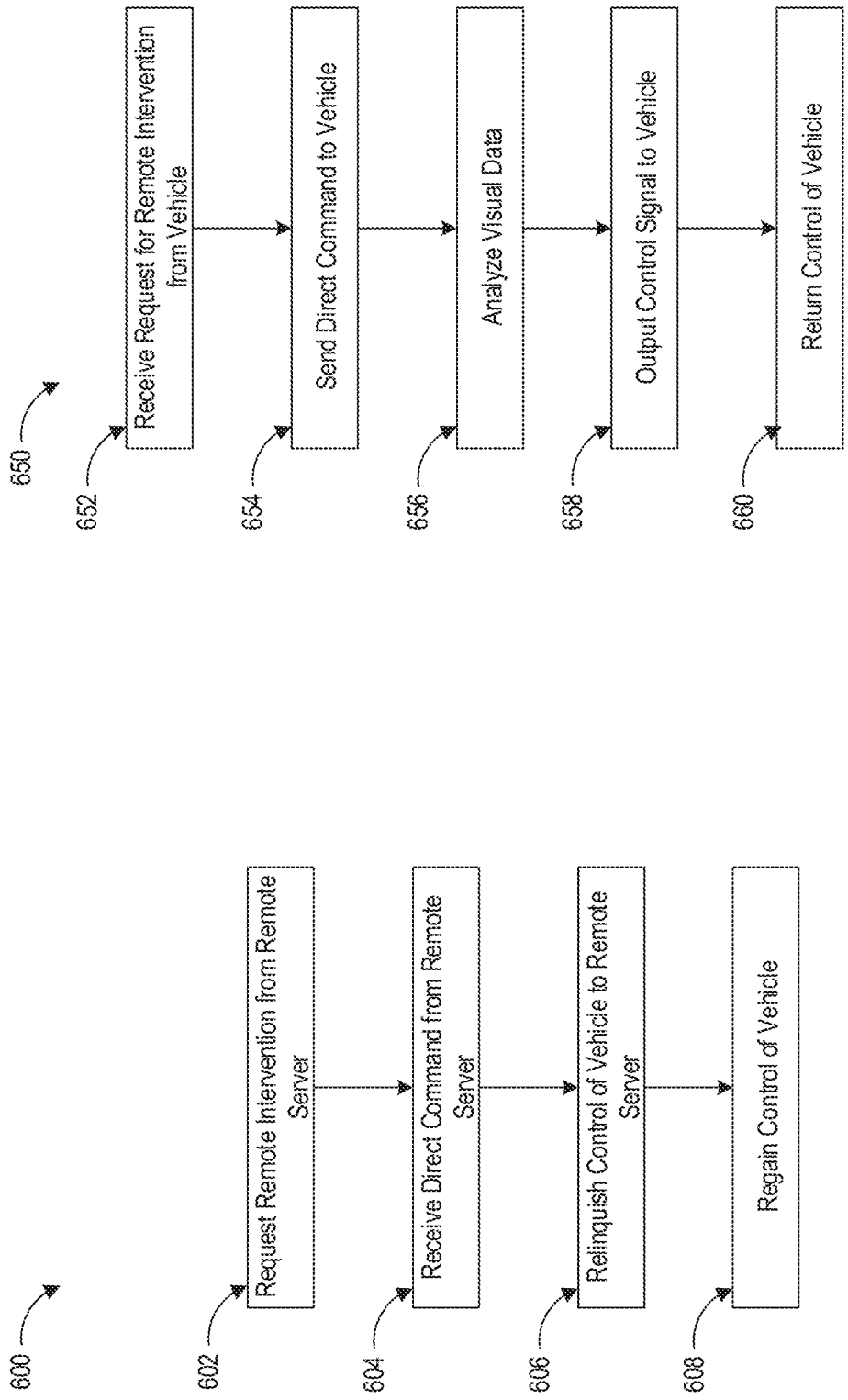

SYSTEM AND METHOD FOR UPDATING VEHICLE OPERATION BASED ON REMOTE INTERVENTION

INCORPORATION BY REFERENCE TO ANY PRIORITY APPLICATIONS

This application claims the benefit of U.S. Patent Application No. 62/786,261, filed Dec. 28, 2018, which is hereby incorporated by reference in their entirety.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like. However, the operation of an autonomous vehicle or a vehicle with driver-assist functionality may become suspended or disabled if the on-board data processing system cannot process the sensor data or cannot determine the proper course of action to take due to unexpected road conditions.

SUMMARY

The present disclosure provides systems and methods of providing remote intervention to vehicles, such as autonomous vehicle, a vehicle that includes driver-assist functionality, or a vehicle used for ride sharing services, when the operation of the vehicle is suspended or disabled. The vehicle can transmit visual data detected by one or more sensors on the vehicle to a remote operator. The remote operator can be a human operator or an artificial intelligence (AI) operator. In some embodiments, the remote operator can provide direct command or decision-making assistance to the vehicle upon analyzing the visual data transmitted by the vehicle. In some embodiments, the vehicle can retain control of the vehicle and output a control signal to update vehicle operation based on aggregated information including a decision-making assistance response from the remote operator and inputs from the one or more sensors.

BRIEF DESCRIPTION OF THE DRAWINGS

FIG. 6A illustrates a flow chart of an example process of a vehicle receiving remote intervention.

FIG. 6B illustrates a flow chart of an example process of a remote operator providing remote intervention to a vehicle.

DETAILED DESCRIPTION

Detailed descriptions and examples of systems and methods according to one or more illustrative embodiments of the present disclosure may be found in the section entitled Example Remote Intervention Systems (including its subsections), as well as in the section entitled Example Embodiments, and also in FIGS. 2A-9 herein. Furthermore, components and functionality for providing remote intervention to a vehicle may be configured and/or incorporated into the networked vehicle environment 100 described herein in FIGS. 1A-1B.

Various embodiments described herein are intimately tied to, enabled by, and would not exist except for, vehicle and/or computer technology. For example, providing remote intervention to a vehicle described herein in reference to various embodiments cannot reasonably be performed by humans alone, without the vehicle and/or computer technology upon which they are implemented.

Networked Vehicle Environment

Figure 1A:
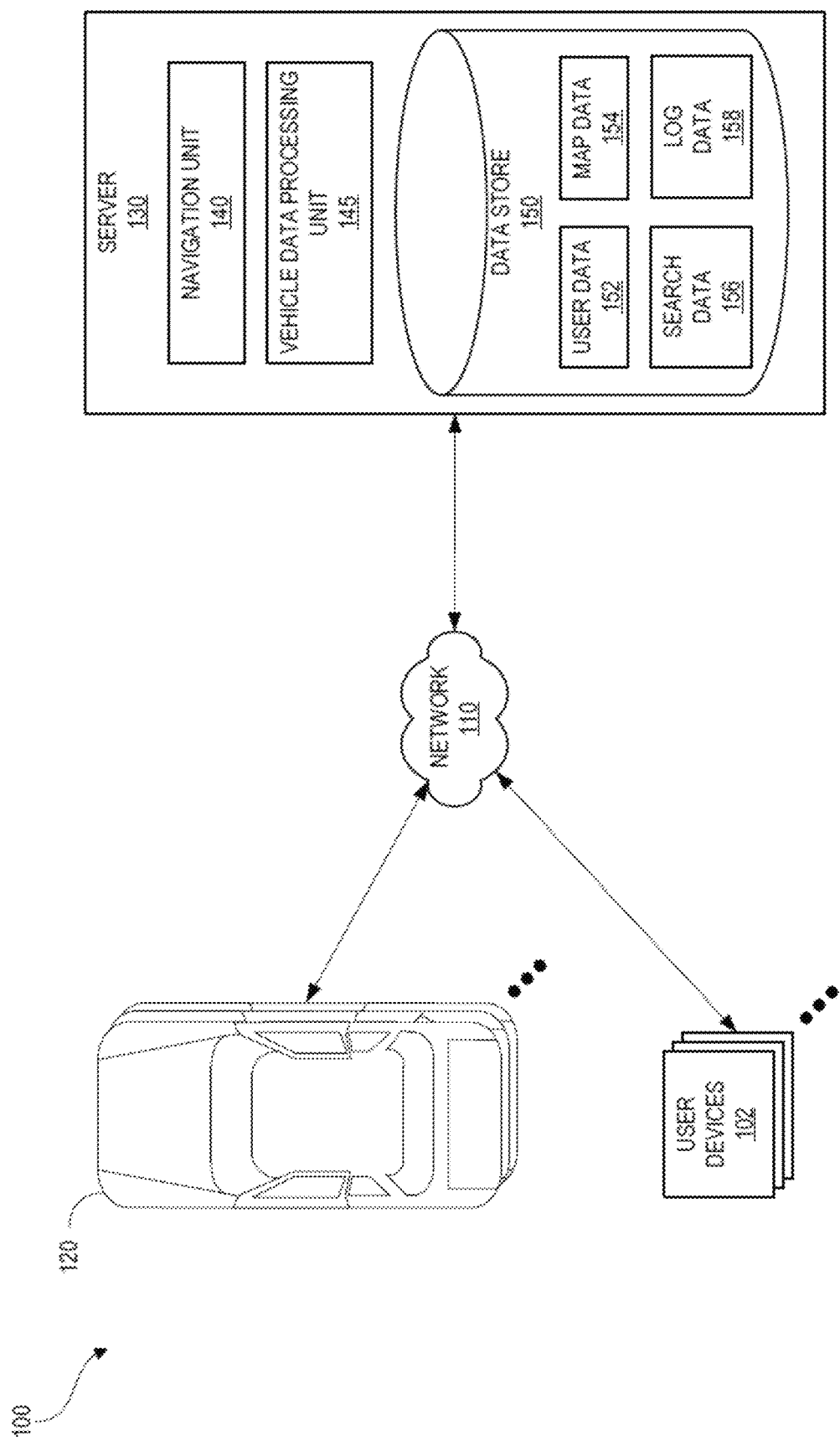
FIG. 1A illustrates a block diagram of a networked vehicle environment in which one or more vehicles and/or one or more user devices interact with a server via a network, according to one embodiment.

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
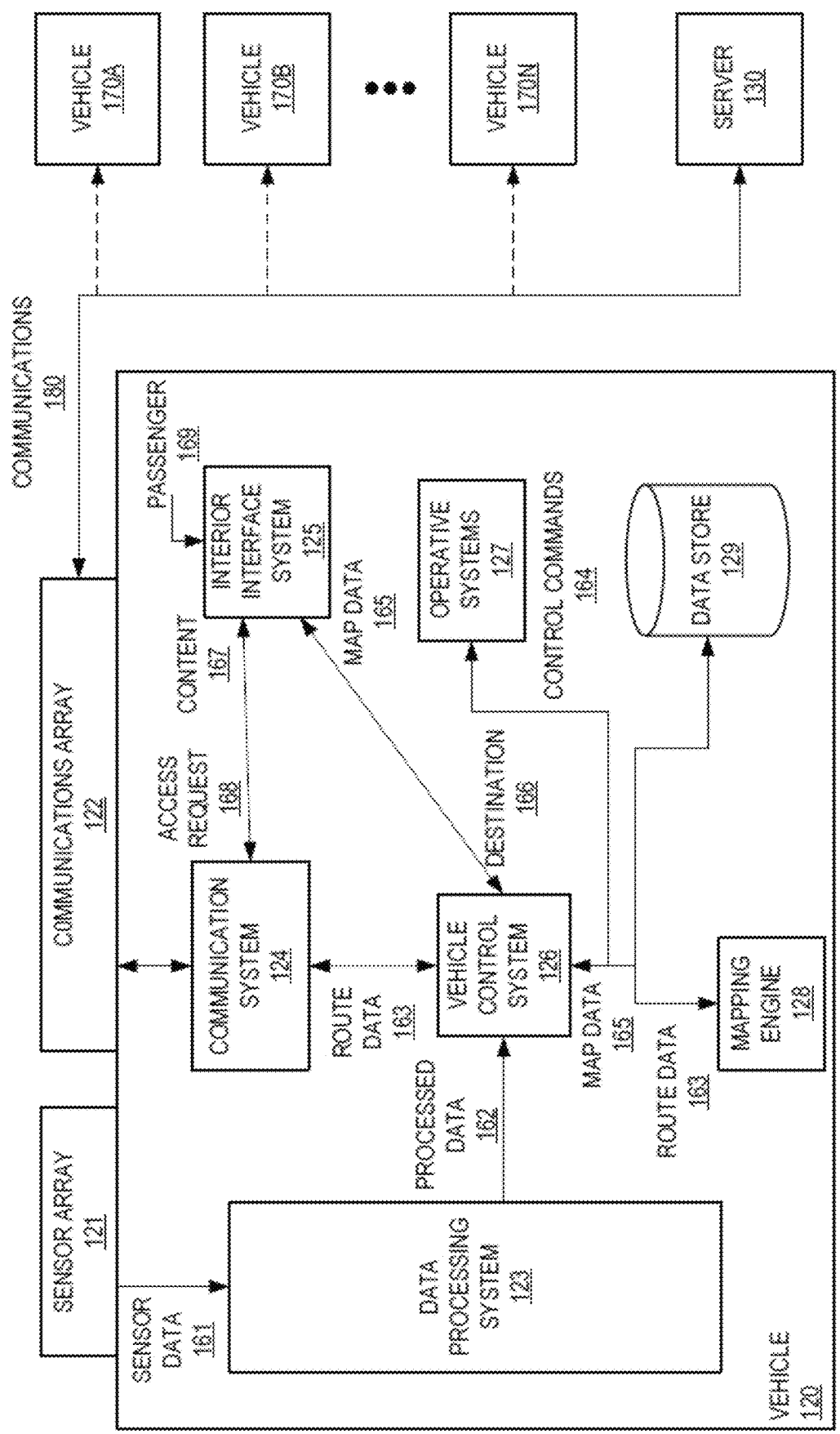
FIG. 1B illustrates a block diagram showing the vehicle of FIG. 1A in communication with one or more other vehicles and/or the server of FIG. 1A, according to one embodiment.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Example Remote Intervention Systems

Figure 2A:
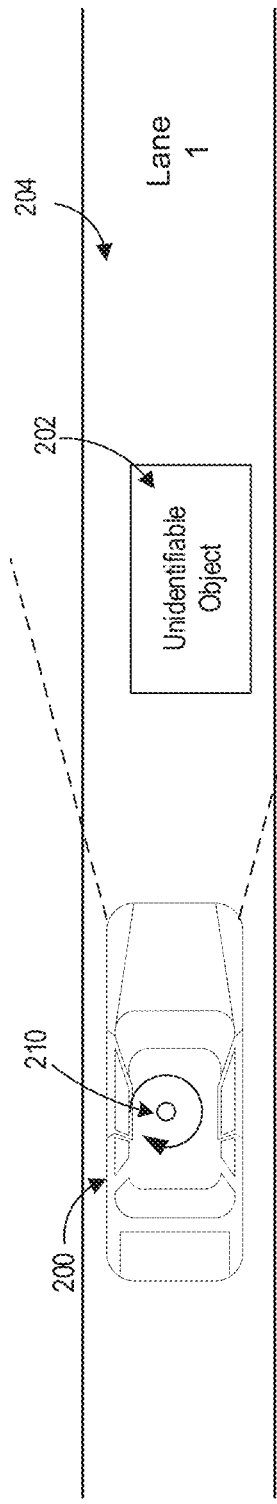
FIGS. 2A-2C illustrate schematically examples when a vehicle may be disabled or its operation may be suspended.
Figure 2B:
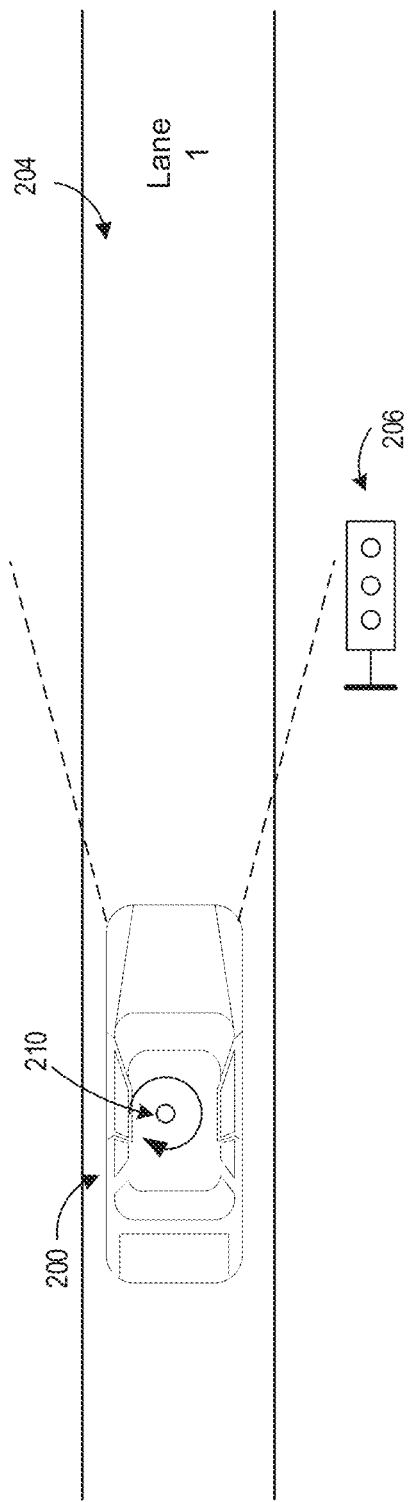

As described above, the vehicle 120, which can be an autonomous vehicle, a vehicle that includes driver-assist features, or a vehicle used for ride-sharing services, can include a plurality of sensors (such as LiDAR, ultrasonic sensor, camera, and the like that are described above) to gather information (such as visual, audio, and the like) that can help its onboard data processing system 123 to make decisions about the operation of the vehicle. However, in some circumstances, operation of the vehicle may remain suspended or disabled. FIGS. 2A-2B illustrate certain conditions in which the operation of a vehicle 200 (which can be the vehicle 120 described above) can be suspended, such as due to the vehicle 200 encountering an indeterminate object when moving on a planned route.

For example, as shown in FIG. 2A, an indeterminate object can include an unknown and/or unexpected obstacle 202 occupying a current lane 204 in which the vehicle 200 is traveling. The obstacle 202 can be detected by a sensor on the vehicle 200, such as the LiDAR 210, camera, Radar, an ultrasonic sensor, or any other sensor disclosed herein. Examples of such unknown and/or unexpected obstacles can include a parade, flooding, objects dropped in the current lane 204 (such as a piece of furniture falling off from the back of a truck). A human driver, when encountering such obstacles, may navigate a vehicle around those obstacles and continue toward a destination location. In contrast, the onboard data processing system of the vehicle 200 may lack an understanding of those obstacles the way a human driver understands the obstacles. For safety reasons, the vehicle 200 may treat those obstacles as indications for stopping or slowing down to a stop, sometimes for a prolonged period of time until the obstacles are removed.

The vehicles may also rely on detecting marker objects (which can be any of the objects disclosed herein, such as traffic lights, road signs, street markers, and the like) along a planned route to ascertain whether the vehicle is following the planned route. Certain marker objects may be located outside the field of detection of the plurality of sensors on the vehicle. As shown in FIG. 2B, the vehicle 200 traveling in the lane 204 is expected to pass a marker object, such as a traffic light 206, on its planned route. The traffic light 206 can be located slightly off of the lane 204. A human driver may be able to determine the presence of the traffic light 206 by looking slightly to the right. However, as the traffic light 206 is located outside the field of detection of the sensor(s) on the vehicle 200, such as the LiDAR 210, camera, Radar, an ultrasonic sensor, or otherwise, the processing system of the vehicle would interpret the sensor data as having a missing marker object. The missing marker object can cause the vehicle 200 to be unable to determine whether the vehicle 200 is traveling on its planned route. For safety reasons, the vehicle 200 may treat the missing marker object as an indication for stopping or slowing down to a stop, sometimes for a prolonged period of time, such as by a server connected to the vehicle (such as the server 130)

confirming the presence of the marker object or confirming that the vehicle is traveling on the planned route.

Figure 2C:
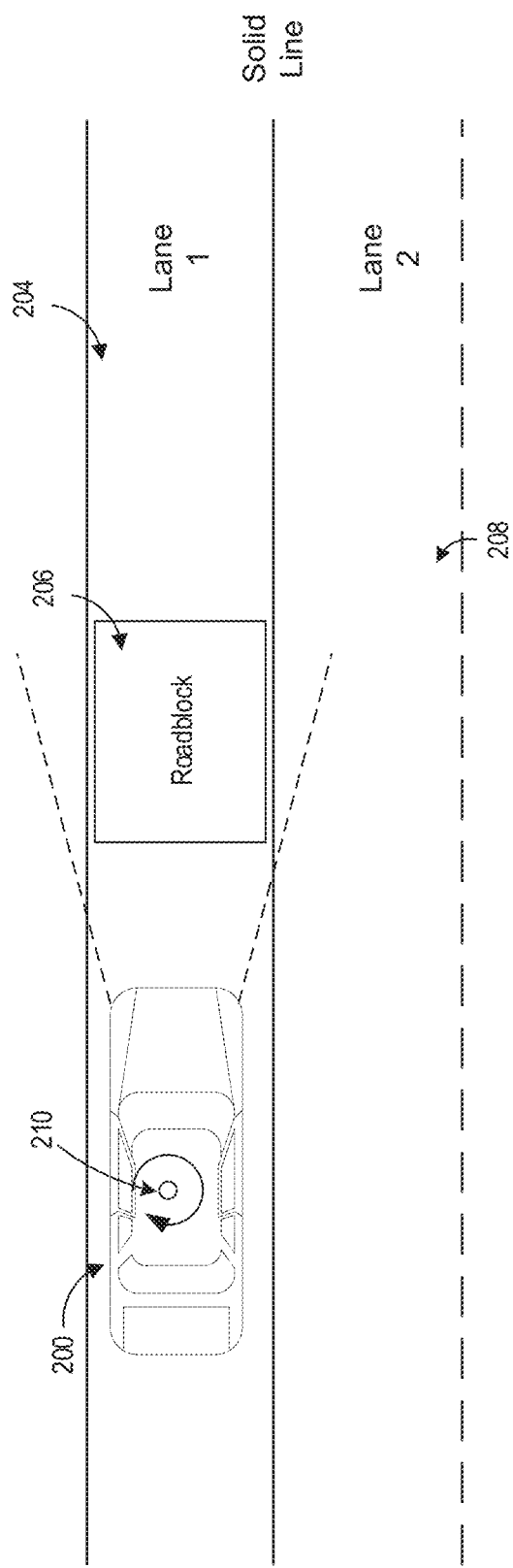

In some instances, the onboard data processing system of a vehicle may need additional authorization for certain maneuvers, such as switching lanes. As shown in FIG. 2C, the vehicle 200 encounters a roadblock 206 in the lane 204 traveled by the vehicle 200. The roadblock 206 can remain in the lane 204 for a prolonged period of time, for example, for more than one hour, two hours, half a day, or longer. A lane 208 adjacent to the lane 204 is available. However, the lanes 204, 208 can be separated by a solid line (for example, when the vehicle 200 has entered a region before the cross-road where lane change is prohibited by traffic rules). A human driver traveling on the lane 204 can circumvent the roadblock 206 by switching to the adjacent lane 208. However, the processing system of the vehicle 200 may be programed to never cross a solid line under any circumstances and may need additional authorization to cross over to the adjacent lane 208.

In situations such as illustrated in FIGS. 2A-2C, the operation of the vehicle 200 may remain suspended. The vehicle 200 may be stuck at its current location for a prolonged period of time, such as one hour, two hours, half a day, or even longer. A service team may need to be dispatched to the vehicle 200 to retrieve the vehicle. Dispatching a service team can be labor-intensive and expensive. Also, as described above, in the situation such as illustrated in FIGS. 2A-2C, the road is not truly undrivable. Rather, the processing system of the vehicle 200 may lack the ability to adapt to the road conditions such as illustrated in FIGS. 2A-2C the way a human driver could.

Figure 3:
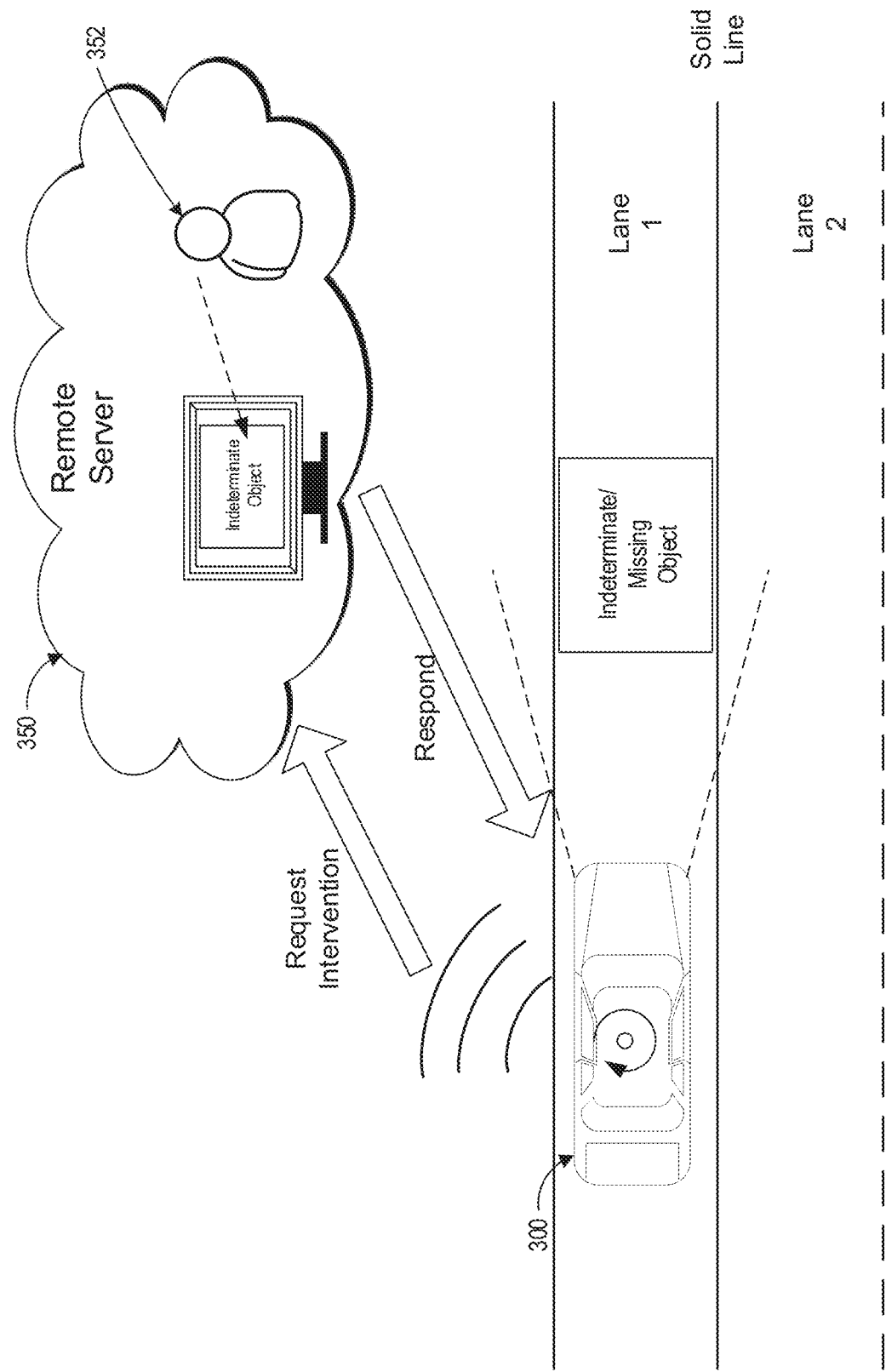
FIG. 3 illustrates schematically an example system for a remote operator to provide remote intervention to a vehicle.

The present disclosure provides systems and methods for reducing the occurrence of situations in which the operation of a vehicle is suspended when a human driver could have continued driving. FIG. 3 illustrates schematically a vehicle 300 (which can be any of the vehicle examples disclosed herein) receiving remote intervention from a remote server 350 (which can be the server 130 described above, or a different server). A remote operator 352 can be located at the remote server 350. The remote operator 352 can be a human operator or an AI operator. When the operation of the vehicle 300 is suspended or disabled, such as in situations as illustrated in FIGS. 2A-2C, the vehicle 300 can send a request for intervention to the remote server 350 via a wireless transmitter (using any of the wireless communication protocols described above) on the vehicle 300. The remote server 350 can provide a response to the vehicle 300 after the remote operator 352 has reviewed the situation in which the operation of the vehicle 300 is suspended. The operation of the vehicle 300 can be updated based at least in part on the response.

Figure 4:
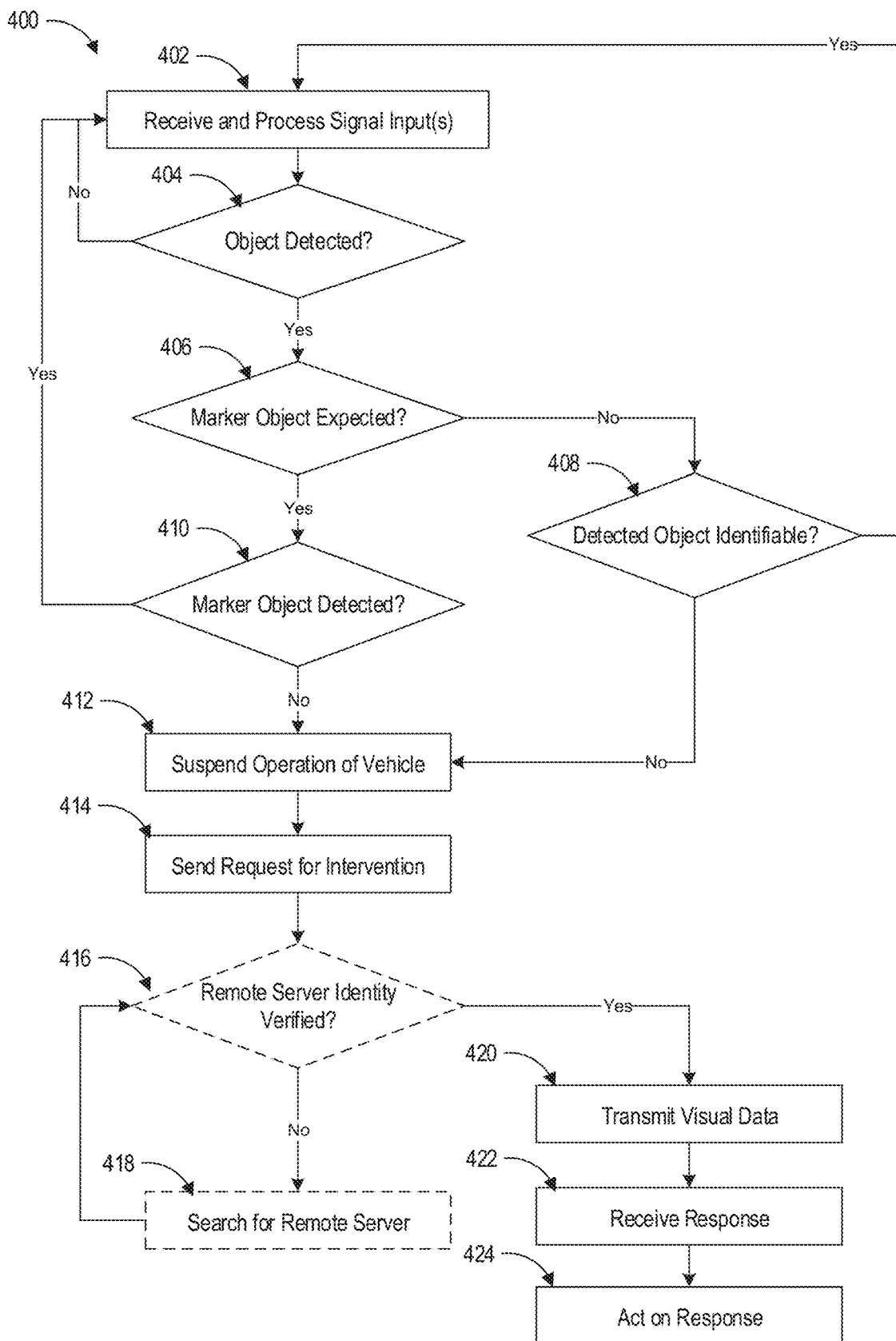
FIG. 4 illustrates a flow chart for an example process of requesting remote intervention by a vehicle.

FIG. 4 illustrates an example process 400 of requesting and receiving remote intervention by an onboard data processing system of a vehicle disclosed herein. At step 402, the onboard data processing system of the vehicle can receive and process signal inputs from the one or more sensors on the vehicle. At decision step 404, the onboard data processing system can determine whether an object can be detected, for example, a predetermined distance ahead of the vehicle and/or in the lane traveled by the vehicle. If no object can be detected, the onboard data processing system can continue to monitor the surroundings by returning to step 402. If an object can be detected, at decision step 406, the onboard data processing system can determine whether a marker object (such as a traffic light or a road sign) is expected to be present ahead of the vehicle.

If a marker object is not expected to be present, at decision step 408, the onboard data processing system can determine whether the detected object is identifiable. If the detected object is identifiable, for example, if the processing system determines that the detected object is a pedestrian, the onboard data processing system can return to step 402 to continue monitoring the surroundings. The onboard data processing system can also implement algorithms for situations involving encounter with a pedestrian, such as by coming to a stop at a predetermined distance from the pedestrian. If the detected object is not identifiable, at step 412, the onboard data processing system can suspend operation of the vehicle for safety reasons as described above. The vehicle can be stopped or slowed down to a stop when the operation of the vehicle is suspended.

If a marker object is expected to be present, at decision step 410, the onboard data processing system can determine whether the detected object is the marker object. If the detected object is the marker object, the onboard data processing system can return to step 402 to continue monitoring the surroundings. If the detected object is not the marker object, the onboard data processing system can also proceed to step 412 to suspend operation of the vehicle, as the onboard data processing system cannot ascertain whether the vehicle is still on the planned route.

At step 414, the onboard data processing system can send a request for intervention to the remote operator via a wireless transmitter. The sequence of steps 412 and 414 can be reversed so that the processing system can send a request for intervention before stopping the vehicle. At step 416, the onboard data processing system can optionally verify the identity of the remote server at which the remote operator is located. If the identity of the remote server cannot be verified, at step 418, the onboard data processing system can search for the appropriate remote server until the identity of a remote server is verified. For example, the onboard data processing system of the vehicle and/or the remote server can send encoded messages to each other for decoding as a form of identity verification.

Once the identity of the remote server is verified, at step 420, the onboard data processing system can transmit the visual data detected by the one or more sensors to the remote server. At step 422, the onboard data processing system can receive a response from the remote server via a wireless receiver. At step 424, the onboard data processing system can act upon the response. As will be described in greater detail below, the action of the onboard data processing system can lead to an update of the operation of the vehicle. The update can include commanding the vehicle to remain stopped as the remote operator may determine that it is unsafe for the vehicle to move. The update can include commanding the vehicle to switch to the adjacent lane and continue on its planned route if the remote operator determines that at least the adjacent lane is safe for traveling. The update can include commanding the vehicle to continue on its current lane if the remote operator determines that the unknown object is not a road hazard (for example, a paper bag or card box) and/or the vehicle is on its planned route (for example, the marker traffic light being located slightly outside the detection field of the sensor(s) on the vehicle).

Figure 5:
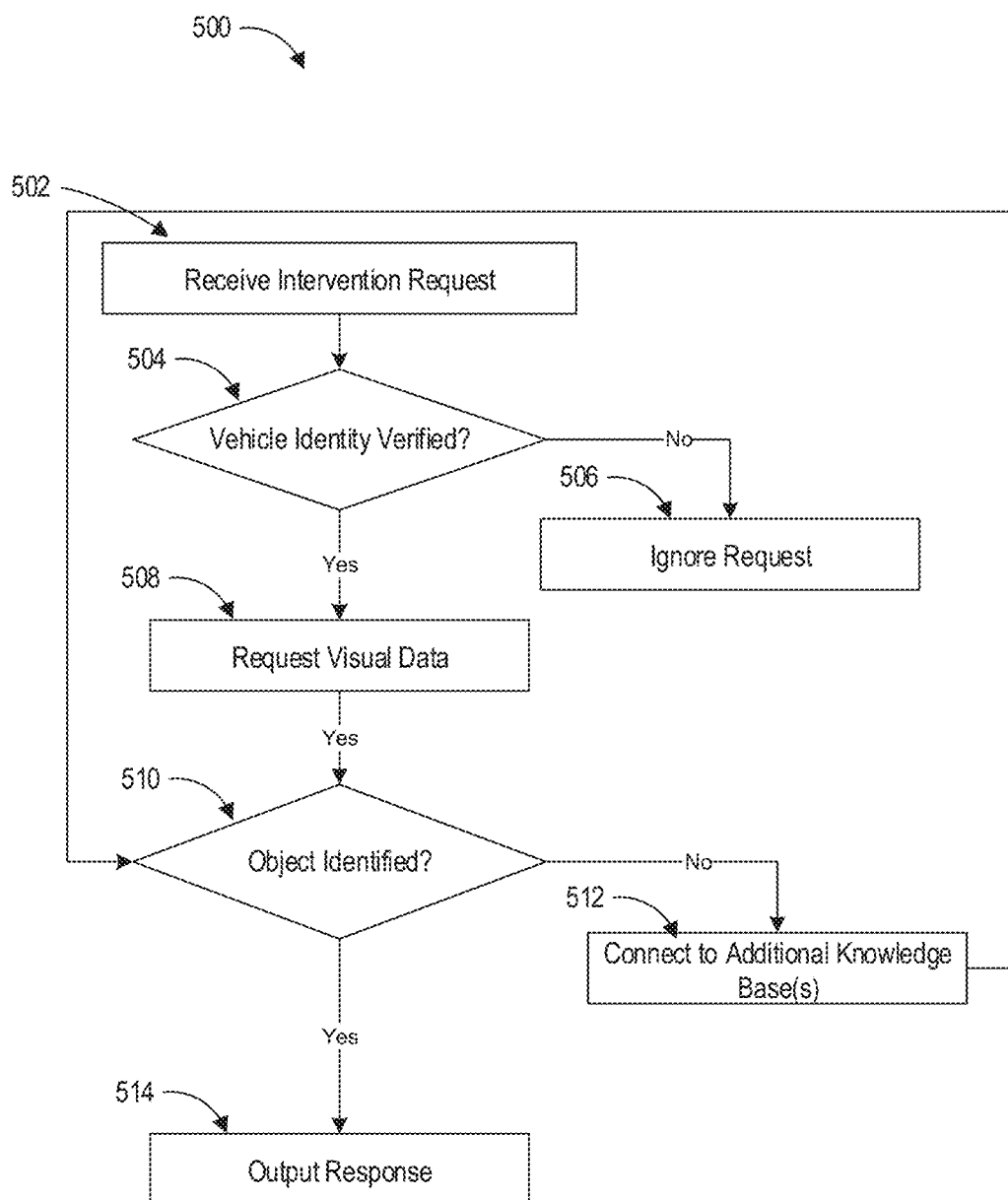
FIG. 5 illustrates a flow chart for an example process of providing a remote intervention response to a vehicle by a remote server.

FIG. 5 illustrates an example process 500 of receiving a remote intervention request from the onboard data processing system of the vehicle disclosed herein and providing a response by the remote server. At step 502, the remote server can receive a request for remote intervention by the onboard data processing system. At decision step 504, the remote server can optionally verify the identity of the vehicle, such as using the methods described above. If the identity of the vehicle cannot be verified, the remote server can ignore the request at step 506 as the remote server may not have authorization to provide remote intervention to the requesting vehicle. If the identity of the vehicle is verified, at step 508, the remote server can request the visual data from the onboard data processing system. Upon receiving the visual data, at decision step 510, the remote operator at the remote server can determine whether the object in the visual data is identifiable. If the object cannot be immediately identified, at step 512, the remote server can connect to additional knowledge bases, such as the local traffic control data, traffic surveillance cameras, or others, that may provide more information to help the remote operator in identifying the object in the visual data or the marker object missing from the visual data. For example, by connecting to traffic surveillance cameras, the remote operator can locate the missing traffic light that are outside the detection field of the one or more sensors of the vehicle. At step 514, the remote server can output the response to the onboard data processing system of the vehicle to provide remote intervention.

Examples of Remote Operator Taking Control

In some embodiments, the remote operator can take over (for example, temporarily) control of operation of the vehicle from the onboard data processing system of the vehicle. As shown in an example process 600 in FIG. 6A, upon the onboard data processing system requesting remote intervention from a remote operator at a remote server at step 602 (which can include any of the additional steps described above with reference to FIGS. 3 and 4), the onboard data processing system can receive a direct command from the remote server at step 604. The direct command can include a command that the onboard data processing system hands over the control of operation of the vehicle to the remote operator, at least for a limited amount of time or for the task of updating the operation of the vehicle until the vehicle is no longer disabled. At step 606, the onboard data processing system can relinquish the control of operation of the vehicle to the remote operator at the remote server. After the remote operator has updated the operation of the vehicle, which can include any of the updates described above, the remote operator can turn the control of operation of the vehicle back to the onboard data processing system and the onboard data processing system can regain the control at step 608.

As shown in the example process 650 in FIG. 6B, the remote server can receive a request for remote intervention from the vehicle at step 652 (which can include any of the additional steps described above with reference to FIGS. 3 and 5). The remote server can send a direct command to the vehicle at step 654 to request for the control of operation of the vehicle. At step 656, the remote operator at the server can analyze the visual data transmitted by the onboard data processing system of the vehicle. The remote operator can output a control signal to the vehicle at step 658. The control signal can command the vehicle to update its operation in any of the manners described above. At step 660, the remote operator can return the control of vehicle to the onboard data processing system of the vehicle. In some embodiments, the remote operator can analyze the visual data before sending a direct command to the vehicle. In some implementations, the remote operator can send a direct command to the vehicle to request the control of operation of the vehicle after having analyzed the visual data transmitted by the vehicle. The remote operator may take control of operation of the vehicle when the remote operator determines that it is safe for the vehicle to continue moving on its current lane and/or on an adjacent lane. The remote operator may send a "remain stopped" response to the vehicle without taking control of the vehicle when the remote operator determines that it is not safe for the vehicle to proceed.

Examples of Remote Operator Providing Decision-Making Assistance

In some embodiments, the remote operator may provide a decision-making assistance response to the vehicle rather than taking over control of the vehicle when the vehicle requests for remote intervention. The onboard data processing system of the vehicle can maintain full control of operation of the vehicle, and can update vehicle operation based at least in part on the decision-making assistance response from the remote operator. The onboard data processing system can also update the vehicle operation based on aggregated information including the response from the remote operator and vehicle-based sensor data.

Figures 7A, 7B:
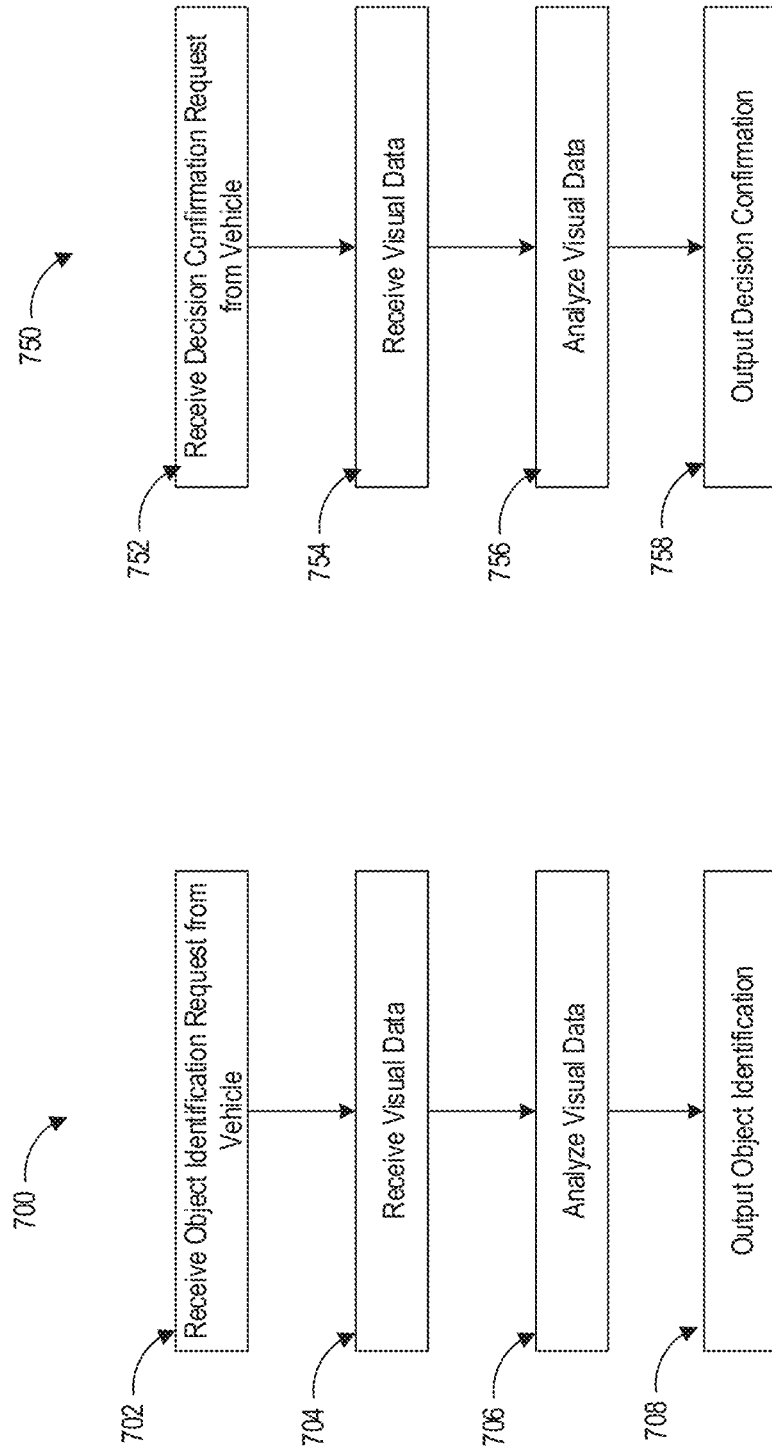
FIGS. 7A-7B illustrate flow charts of examples of remote intervention provided by a remote server.

As shown in an example process 700 of FIG. 7A, the remote server can receive a request for remote intervention at step 702 in the form of an object identification request from any of the example vehicles described above. The remote server can request and receive visual data from the vehicle in any manner described above at step 704. The remote server can analyze the visual data to identify the object in the visual data at step 706. As described above, the remote server is capable of connecting to additional knowledge bases and/or resources that may help in identifying the object in the visual data. At step 708, the remote server can output a response in the form of an identification of the object.

As shown in an example process 750 of FIG. 7B, the remote server can receive a request for remote intervention at step 752 in the form of a decision confirmation request from any of the example vehicles described above. The decision confirmation request can be, for example, a request for authorization to pass a solid line into an adjacent unblock lane, a request to confirm that the unknown object is or is not a road hazard, or a request to confirm that the vehicle is on the planned route. The remote server can request and receive visual data from the vehicle in any manner described above at step 754. The remote server can analyze the visual data to identify the object in the visual data at step 756. As described above, the remote server is capable of connecting to additional knowledge bases and/or resources that may help in analyzing the visual data and confirming the decision suggested by the onboard data processing system of the vehicle. At step 758, the remote server can output a response in the form of a decision confirmation.

Figure 8A:
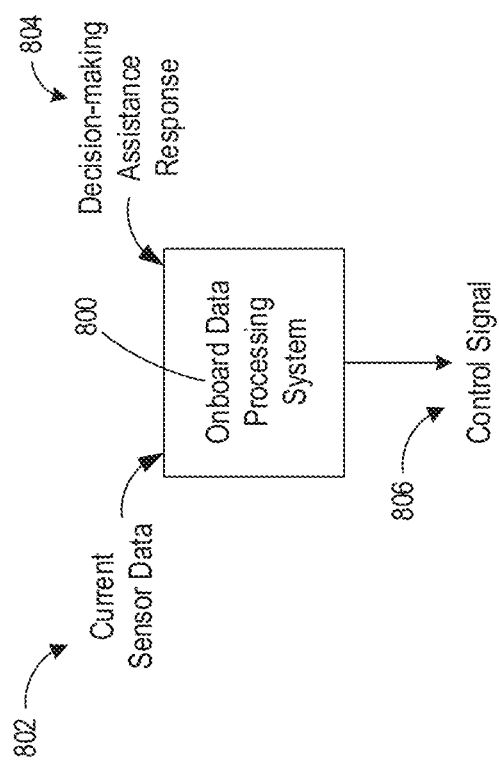
FIG. 8A illustrates an example decision-making block diagram of an onboard data processing system of a vehicle.

FIG. 8A illustrates an example onboard data processing system 800 of any of the vehicle examples disclosed herein. As discussed above, the onboard data processing system 800 can receive a decision-making assistance response 804 (such as an object identification and/or a decision confirmation) from a remote operator located at a remote server. The onboard data processing system 800 can also receive current sensor data 802 from the one or more sensors disclosed herein. The onboard data processing system 800 can output a control signal 806 to update the operation of the vehicle based on both the current vehicle-based sensor data 802 and the decision-making assistance response 804 from the remote operator. The onboard data processing system 800 can thus combine the more intelligent and more flexible decision-making ability of the remote operator and the more current and/or more real-time detection of the surroundings to improve the efficiency, accuracy, and safety of the final control signal in updating the operation of the vehicle. For example, after the remote operator has determined that the indeterminate object is not a road hazard or it is safe to cross a solid line to the adjacent lane, the sensor(s) on the vehicle may detect additional road hazard or safety issues, such as a pedestrian crossing the road in the meantime. The additional sensor data can allow the onboard data processing system to adjust the control signal, such as to wait for the pedestrian to cross to the other side of the road before implementing the decision based on the response from the remote operator.

Figure 8B:
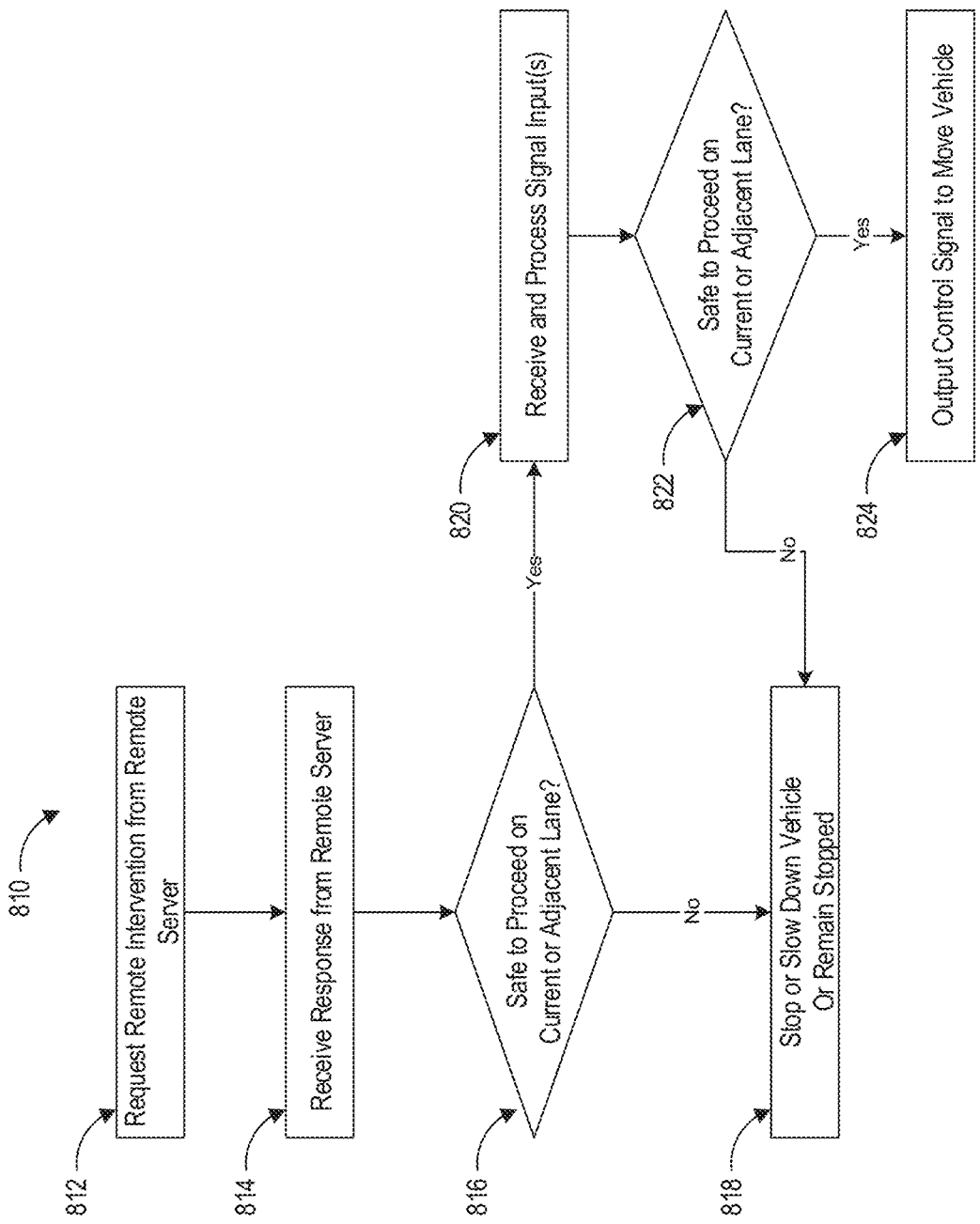
FIG. 8B illustrates a flow chart of an example process by a vehicle making decisions about movements of the vehicle based on a remote intervention response from a remote server and vehicle-based sensor data.

As shown in an example process 810 of FIG. 8B, the onboard data processing system of the vehicle can update the operation of the vehicle using remote intervention. The onboard data processing system can request for remote intervention from a remote server at step 812. As described above, the onboard data processing system can make such a request when the operation of the vehicle is suspended or disabled, such as in situations illustrated in FIGS. 2A-2C. The onboard data processing system can receive a response from the remote server at step 814. The response can be a decision-making assistance response. At decision step 816, the onboard data processing system can determine whether it is safe to proceed in the current lane or the adjacent lane. The onboard data processing system can make this determination based on the response from the remote server. If the onboard data processing system determines that it is not safe for the vehicle to proceed, at step 818, the onboard data processing system can suspend operation of the vehicle so that the vehicle can slow down to a stop (for example, at a predetermined distance away from the indeterminate object) or the vehicle can remain stopped. In some embodiments, the onboard data processing system of the vehicle can send the request for remote intervention after the vehicle has come to substantially a stop. In some embodiments, the onboard data processing system can send the request for intervention as the onboard data processing system anticipates that the vehicle is about to be stopped (for example, as the vehicle is approaching the indeterminate object or roadblock).

If the onboard data processing system determines that it is safe for the vehicle to proceed, at step 820, the onboard data processing system can receive and process the signal inputs from the one or more sensors on the vehicle. At decision step 822, the onboard data processing system can determine based on the vehicle-based current sensor data whether it is still safe to proceed on the current or adjacent lane. If the onboard data processing system determines that it is not safe for the vehicle to proceed, the onboard data processing system can proceed to step 818 to suspend operation of the vehicle so that the vehicle can slow down to a stop or the vehicle can remain stopped. If the onboard data processing system determines that it is safe for the vehicle to proceed based on aggregated information from the remote operator and the sensors, the onboard data processing system can output a control signal to update the operation of the vehicle at step 824. The control signal can move the vehicle in its current lane or move the vehicle to an adjacent lane.

Examples AI Operators

The remote operator can be a human operator or an AI operator. The AI operator may be employed to more efficiently handle requests from vehicles that are of the same or substantially similar nature as having been handled by a human operator. The AI can automate the response output based on the response from the human operator. The AI operator can be training, for example, via deep learning or a neural network model. The human operator can be deployed to respond to new requests or to analyze new visual data.

Figure 9:
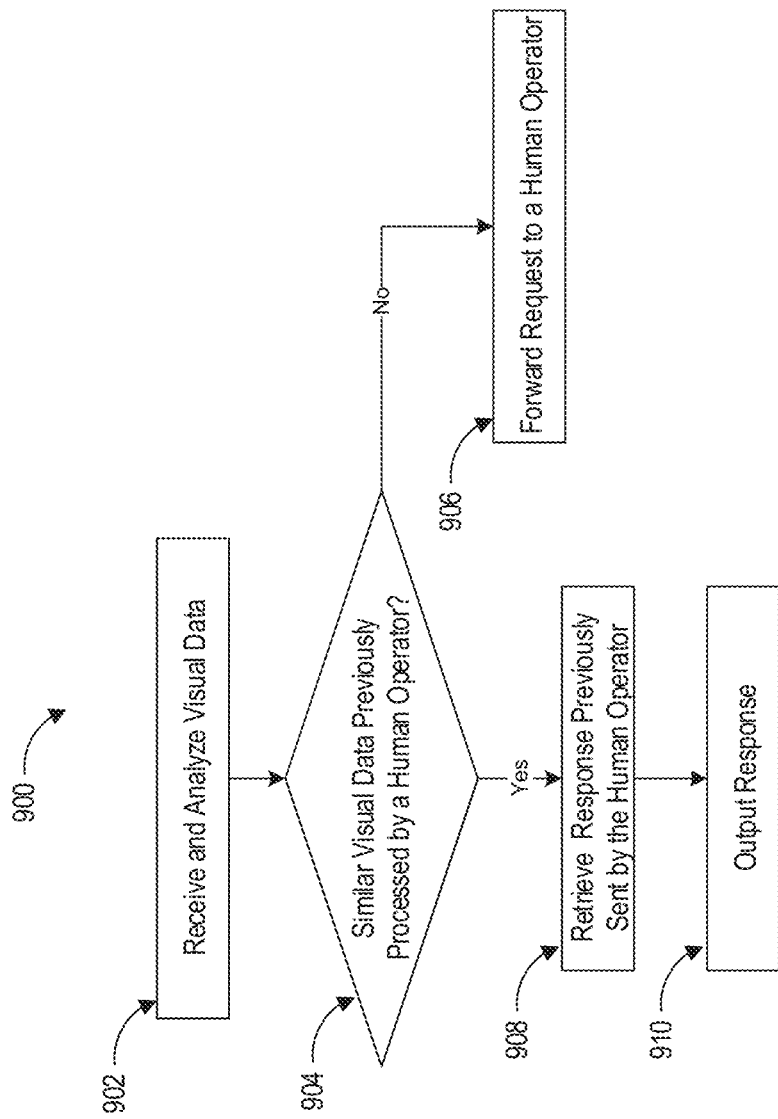
FIG. 9 illustrates a flow of an example process performed by an artificial intelligence (AI) operator in providing remote intervention to a vehicle.

In the example process 900 shown in FIG. 9, the AI operator can receive and analyze visual data from the vehicle that requests remote intervention at step 902. At decision 904, the AI operator can determine whether similar visual data has been previously processed by a human operator. For example, the AI operator can compare the current visual data with previously processed visual data by comparing the visual data pixel by pixel, and/or by comparing the time and/or location (such as cross roads) of the requesting vehicle. If the visual data is not similar to any previously processed visual data (such as when the object in the visual data is different than the object in the previously processed visual data), the AI operator can forward the request to a human operator at step 906. If the visual data is similar or the same to any previously processed visual data, such as when both sets of visual data show the same object, the AI operator can retrieve the response previously provided by the human operator at step 908. The AI operator can output a response based on the previously sent response and the nature of the request at step 910. The response outputted by the AI operator can be of the same or different nature as the previous response. In some embodiments, the response outputted by the AI operator can depend on the nature of the request from the vehicle and can be a direct command or a decision-making assistance response. The use of AI operators for processing similar requests or similar visual data sets can improve the efficiency in providing remote intervention to the vehicles, and thereby reducing the standby time when the operation of the vehicles are suspended or disabled.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, the control signal to update the operation of the vehicle can be directed to a controller of the wheels and/or a controller of the brake of the vehicle, which may be separate controllers from the onboard data processing system, so as to move the vehicle or cause the vehicle to remain stopped.

Example Embodiments

Some example enumerated embodiments of the present invention are recited in this section in the form of methods, systems, and non-transitory computer-readable media, without limitation.

In some embodiments, a vehicle configured to receive remote intervention can comprise an onboard hardware processor, at least one sensor in electronic communication with the onboard hardware processor, the at least one sensor configured to detect visual data about a road on which the vehicle is traveling and transmitting the visual data to the onboard hardware processor, a wireless transmitter, and a wireless receiver, wherein the onboard hardware processor can be configured to transmit a remote intervention request to a remote server via the wireless transmitter in response to an operation of the vehicle being suspended, transmit the visual data to the remote server, receive a response from the remote server in response to the remote intervention request via the wireless receiver, and act upon the response, the acting resulting in a control signal to update the operation of the vehicle.

In some embodiments, the vehicle can incorporate one or more of the following features: the visual data can comprise three-dimensional image data; the operation of the vehicle can be suspended upon the visual data containing an indeterminate object; the indeterminate object can comprise an unidentifiable object; the indeterminate object can comprise a missing marker object; the operation of the vehicle can be suspended upon a currently lane traveled by the vehicle being blocked and the current lane being separated from an adjacent lane by a solid line; the onboard hardware processor can stop or slow down the vehicle in response to the operation of the vehicle being suspended; the vehicle can be an autonomous driving vehicle; the response can comprise a direct command to the onboard hardware processor; the onboard hardware processor can be configured to act upon the direct command by relinquishing control of the vehicle to the remote server, wherein the remote server can be configured to output the control signal to the vehicle; the response can comprise a classification of the indeterminate object or a confirmation of a decision suggested by the onboard hardware processor; the onboard hardware processor can be configured to output a control signal to update the operation of the vehicle based at least in part on the response; the onboard hardware processor can output the control signal based at least in part on additional signal inputs from the at least one sensor; the at least one sensor can comprise LiDAR, camera, infrared camera, ultrasonic transducer, Radar, or a combination thereof; the response from the remote server can be provided by a human operator viewing the visual data; the response from the remote server can be provided by an artificial intelligence (AI) operator viewing the visual data; the response provided by the AI operator can be based on a prior response provided by a human operator; the vehicle can move to an adjacent free lane in response to the control signal; the vehicle can move in its current lane in response to the control signal; the vehicles can remain stopped in response to the control signal.

In some embodiments, a method of providing remote invention by a remote server to a vehicle can comprise using an onboard hardware processor of the vehicle, receiving signal inputs from at least one sensor of the vehicle in electronic communication with the onboard hardware processor, the at least one sensor configured to detect visual data about a road on which the vehicle is traveling; outputting a remote intervention request to a remote server via a wireless transmitter in response to an operation of the vehicle being suspended; transmitting the visual data to the remote server; receiving a response from the remote server in response to the remote intervention request via a wireless receiver; and acting upon the response, the acting resulting in a control signal to update the operation of the vehicle.

In some embodiments, the method can incorporate one or more of the following features: the visual data can comprise three-dimensional image data; the operation of the vehicle can be suspended upon the visual data containing an indeterminate object; the indeterminate object can comprise an unidentifiable object; the indeterminate object can comprise a missing marker object; the operation of the vehicle can be suspended upon a currently lane traveled by the vehicle being blocked and the current lane being separated from an adjacent lane by a solid line; the method can further comprise stopping or slowing down the vehicle in response to the operation of the vehicle being suspended; the vehicle can be an autonomous driving vehicle; the response can comprise a direct command to the onboard hardware processor; the acting can comprise relinquishing control of the vehicle to the remote server, wherein the remote server can be configured to output the control signal to the vehicle; the response can comprise a classification of the indeterminate object or a confirmation of a decision suggested by the onboard hardware processor; the acting can comprise outputting a control signal to update the operation of the vehicle based at least in part on the response; the method can further comprise outputting the control signal based at least in part on additional signal inputs from the at least one sensor; the at least one sensor can comprise LiDAR, camera, infrared camera, ultrasonic transducer, Radar, or a combination thereof; the response from the remote server can be provided by a human operator viewing the visual data; the response from the remote server can be provided by an artificial intelligence (AI) operator viewing the visual data; the response provided by the AI operator can be based on a prior response provided by a human operator; the vehicle can move to an adjacent free lane in response to the control signal; the vehicle can move in its current lane in response to the control signal; the vehicles can remain stopped in response to the control signal.

In some embodiments, a configured to update vehicle operation in response to remote intervention can comprise an onboard hardware processor, at least one sensor in electronic communication with the onboard hardware processor, the at least one sensor configured to detect visual data about a road on which the vehicle is traveling and transmitting, on a regular basis, the visual data to the onboard hardware processor, a wireless transmitter, and a wireless receiver, wherein the onboard hardware processor can be configured to transmit a request for decision-making assistance to a remote server via the wireless transmitter in response to an operation of the vehicle being suspended, transmit the visual data to the remote server, receive a decision-making assistance response from the remote server in response to the request via the wireless receiver, and output a control signal to update the operation of the vehicle based on an aggregated information comprising the response and the visual data transmitted on the regular basis from the at least one sensor.

In some embodiments, the vehicle can incorporate one or more of the following features: the request for decision-making assistance can comprise an object classification request or a decision confirmation request; the decision-making assistance response can comprise an object classification response or a decision confirmation response; the visual data can comprise three-dimensional image data; the operation of the vehicle can be suspended upon the visual data containing an indeterminate object; the object classification request can comprise a request to identify an unknown object; the decision confirmation request can comprise a request to authorize moving to an adjacent lane separated from a current lane by a solid line; the decision confirmation request can comprise a request to confirm whether it is safe to continue traveling in current lane; the decision confirmation request can comprise a request to confirm presence of a missing marker object; the onboard hardware processor can stop or slow down the vehicle in response to the operation of the vehicle being suspended; the vehicle can be an autonomous driving vehicle; the response can comprise a direct command to the onboard hardware processor; the onboard hardware processor can be configured to act upon the direct command by relinquishing control of the vehicle to the remote server, wherein the remote server can be configured to output the control signal to the vehicle; the response can comprise a classification of the indeterminate object or a confirmation of a decision suggested by the onboard hardware processor; the onboard hardware processor can be configured to output a control signal to update the operation of the vehicle based at least in part on the response; the onboard hardware processor can output the control signal based at least in part on additional signal inputs from the at least one sensor; the at least one sensor can comprise LiDAR, camera, infrared camera, ultrasonic transducer, Radar, or a combination thereof; the response from the remote server can be provided by a human operator viewing the visual data; the response from the remote server can be provided by an artificial intelligence (AI) operator viewing the visual data; the response provided by the AI operator can be based on a prior response provided by a human operator; the vehicle can move to an adjacent free lane in response to the control signal; the vehicle can move in its current lane in response to the control signal; the vehicles can remain stopped in response to the control signal; the at least one sensor can continuously transmit the visual data to the onboard hardware processor.

In some embodiments, a method of updating vehicle operation in response to remote intervention can comprise using an onboard hardware processor of the vehicle, receiving, on a regular basis, signal inputs from at least one sensor of the vehicle in electronic communication with the onboard hardware processor, the at least one sensor configured to detect visual data about a road on which the vehicle is traveling; outputting a request for decision-making assistance to a remote server via a wireless transmitter in response to an operation of the vehicle being suspended; transmitting the visual data to the remote server; receiving a decision-making assistance response from the remote server in response to the request via a wireless receiver; and outputting a control signal to update the operation of the vehicle based on an aggregated information comprising the response and the visual data transmitted on the regular basis from the at least one sensor.

In some embodiments, the method can incorporate one or more of the following features: the request for decision-making assistance can comprise an object classification request or a decision confirmation request; the decision-making assistance response can comprise an object classification response or a decision confirmation response; the visual data can comprise three-dimensional image data; the operation of the vehicle can be suspended upon the visual data containing an indeterminate object; the object classification request can comprise a request to identify an unknown object; the decision confirmation request can comprise a request to authorize moving to an adjacent lane separated from a current lane by a solid line; the decision confirmation request can comprise a request to confirm whether it is safe to continue traveling in current lane; the decision confirmation request can comprise a request to confirm presence of a missing marker object; the method can further comprise stopping or slowing down the vehicle in response to the operation of the vehicle being suspended; the vehicle can be an autonomous driving vehicle; the response can comprise a direct command to the onboard hardware processor; the onboard hardware processor can be configured to act upon the direct command by relinquishing control of the vehicle to the remote server, wherein the remote server can be configured to output the control signal to the vehicle; the response can comprise a classification of the indeterminate object or a confirmation of a decision suggested by the onboard hardware processor; the onboard hardware processor can be configured to output a control signal to update the operation of the vehicle based at least in part on the response; the onboard hardware processor can output the control signal based at least in part on additional signal inputs from the at least one sensor; the at least one sensor can comprise LiDAR, camera, infrared camera, ultrasonic transducer, Radar, or a combination thereof; the response from the remote server can be provided by a human operator viewing the visual data; the response from the remote server can be provided by an artificial intelligence (AI) operator viewing the visual data; the response provided by the AI operator can be based on a prior response provided by a human operator; the vehicle can move to an adjacent free lane in response to the control signal; the vehicle can move in its current lane in response to the control signal; the vehicles can remain stopped in response to the control signal; the receiving can comprise continuously receiving the visual data from the at least one sensor.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A vehicle configured to update vehicle operation in response to remote intervention, the vehicle comprising:
    an onboard hardware processor;
    at least one sensor in electronic communication with the onboard hardware processor, the at least one sensor configured to detect visual data about a road on which the vehicle is traveling and transmitting, on a regular basis, the visual data to the onboard hardware processor;
    a wireless transmitter; and
    a wireless receiver,
    wherein the onboard hardware processor is configured to:
        transmit a request for decision-making assistance to a remote server via the wireless transmitter in response to an operation of the vehicle being suspended,
        transmit the visual data to the remote server, receive a decision-making assistance response from the remote server in response to the request via the wireless receiver, wherein the decision-making assistance response from the remote server is automated by an artificial intelligence (AI) operator in response to the request for decision-making assistance being of the same or similar nature as a prior request handled by a human operator based at least in part on the AI operator comparing the visual data with previous visual data processed by the human operator, wherein the AI operator is configured to compare the visual data with all the previously processed visual data by one or both of:

comparing the visual data with all the previously processed visual data pixel by pixel, or comparing one or both of time or location of the vehicle and all the previously processed visual data; and output a control signal to update the operation of the vehicle based on an aggregated information comprising the response and the visual data transmitted on the regular basis from the at least one sensor.

2. The vehicle of claim 1, wherein the decision-making assistance response comprises an object classification response or a decision confirmation response.

3. The vehicle of claim 1, wherein the visual data comprises three-dimensional image data.

4. The vehicle of claim 1, wherein the object classification request comprises a request to identify an unknown object.

5. The vehicle of claim 1, wherein the decision confirmation request comprises a request to authorize moving to an adjacent lane separated from a current lane by a solid line.

6. The vehicle of claim 1, wherein the decision confirmation request comprises a request to confirm whether it is safe to continue traveling in current lane.

7. The vehicle of claim 1, wherein the decision confirmation request comprises a request to confirm presence of a missing marker object.

8. The vehicle of claim 1, wherein the vehicle is an autonomous driving vehicle.

9. The vehicle of claim 1, wherein the at least one sensor comprises LiDAR, camera, infrared camera, ultrasonic transducer, Radar, or a combination thereof.

10. The vehicle of claim 1, wherein the vehicle moves to an adjacent free lane or in its current lane in response to the control signal.

11. The vehicle of claim 1, wherein the vehicles remains stopped in response to the control signal.

12. A method of updating vehicle operation in response to remote intervention, the method comprising:

using an onboard hardware processor of the vehicle:

receiving, on a regular basis, signal inputs from at least one sensor of the vehicle in electronic communication with the onboard hardware processor, the at least one sensor configured to detect visual data about a road on which the vehicle is traveling;

outputting a request for decision-making assistance to a remote server via a wireless transmitter in response to an operation of the vehicle being suspended;

transmitting the visual data to the remote server;

receiving a decision-making assistance response from the remote server in response to the request via a wireless receiver, wherein the decision-making assistance response from the remote server is automated by an artificial intelligence (AI) operator in response to the request for decision-making assistance being of the same or similar nature as a prior request handled by a human operator based at least in part on the AI operator comparing the visual data with previous visual data processed by the human operator wherein the AI operator compares the visual data with all the previously processed visual data by one or both of:

comparing the visual data with all the previously processed visual data pixel by pixel, or comparing one or both of time or location of the vehicle and all the previously processed visual data; and outputting a control signal to update the operation of the vehicle based on an aggregated information comprising the response and the visual data transmitted on the regular basis from the at least one sensor.

13. The method of claim 12, wherein the decision-making assistance response comprising an object classification response or a decision confirmation response.

14. The method of claim 12, wherein the visual data comprises three-dimensional image data.

15. The method of claim 12, wherein the object classification request comprises a request to identify an unknown object.

16. The method of claim 12, wherein the decision confirmation request comprises a request to authorize moving to an adjacent lane separated from a current lane by a solid line.

17. The method of claim 12, wherein the decision confirmation request comprises a request to confirm whether it is safe to continue traveling in current lane.

18. The method of claim 12, wherein the decision confirmation request comprises a request to confirm the presence of a missing marker object.

19. The method of claim 12, wherein the vehicle is an autonomous driving vehicle.

20. The method of claim 12, wherein the at least one sensor comprises LiDAR, camera, infrared camera, ultrasonic transducer, Radar, or a combination thereof.

21. The method of claim 12, wherein the vehicle moves to an adjacent free lane or in its current lane in response to the control signal.

22. The method of claim 12, wherein the vehicles remains stopped in response to the control signal.

23. The vehicle of claim 1, wherein the AI operator is configured to determine that the request for decision-making assistance is of the same or similar nature as the previous request handled by the human operator in response to the visual data and the previous visual data showing a same object.

24. The method of claim 12, wherein the AI operator is configured to determine that the request for decision-making assistance is of the same or similar nature as the previous request handled by the human operator in response to the visual data and the previous visual data showing a same object.

* * * * *